May 26, 1942.  F. MARQUART  2,284,403
AUTOMATIC MEANS FOR CONTROLLING A WELDING MACHINE
Filed March 1, 1941  2 Sheets—Sheet 1
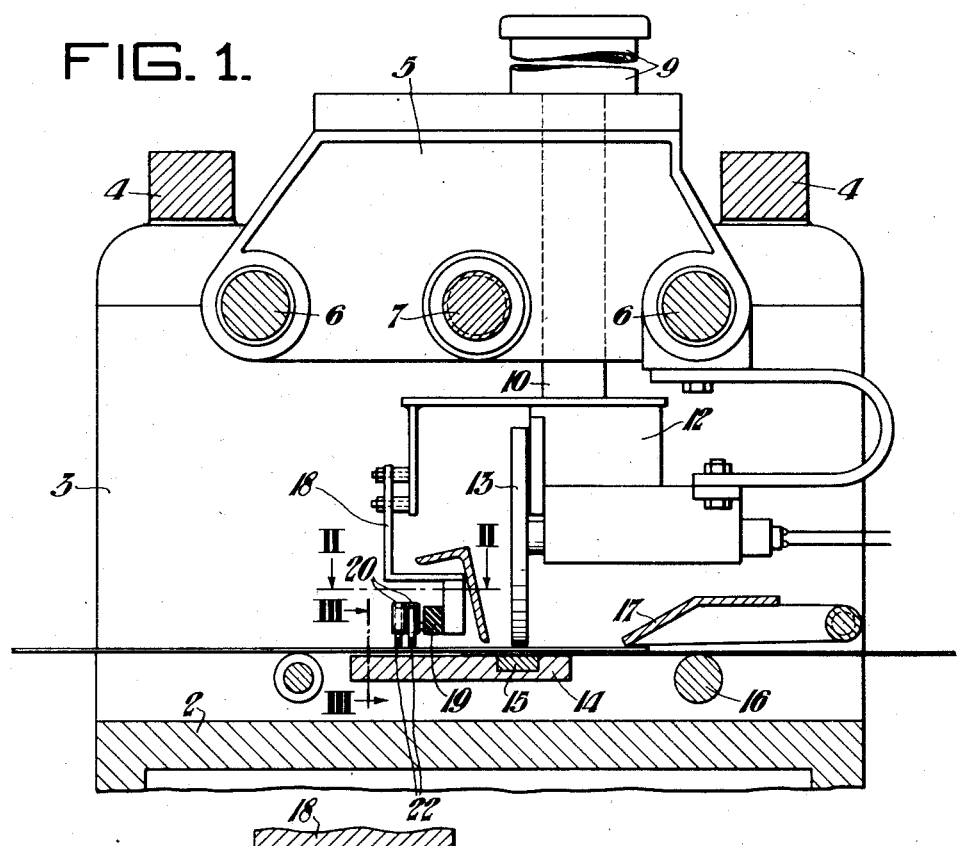
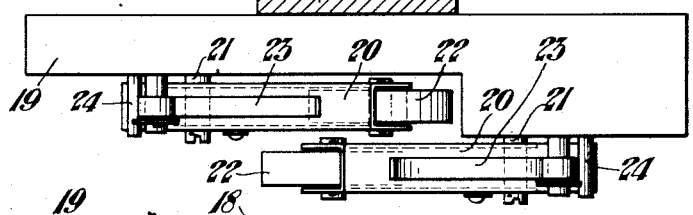
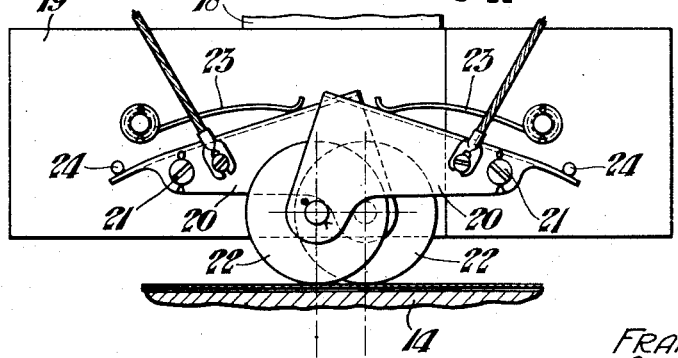
Inventor:
Frank Marquart,
by: John E. Jackson
his Attorney.

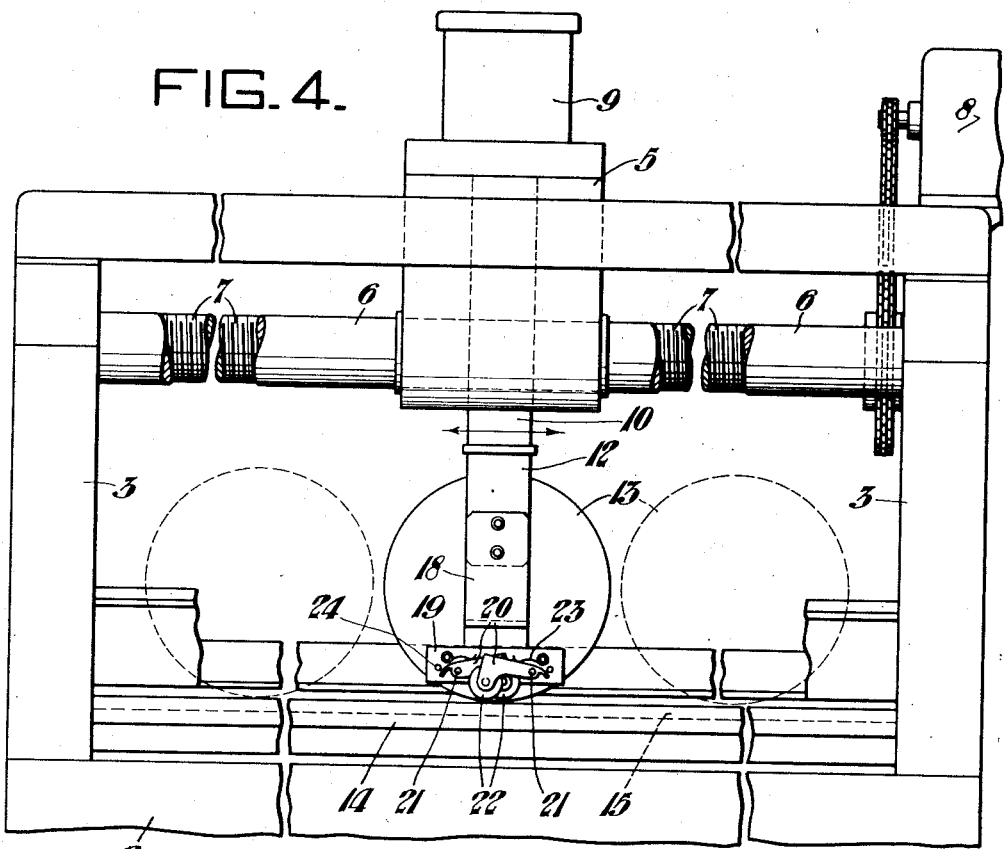
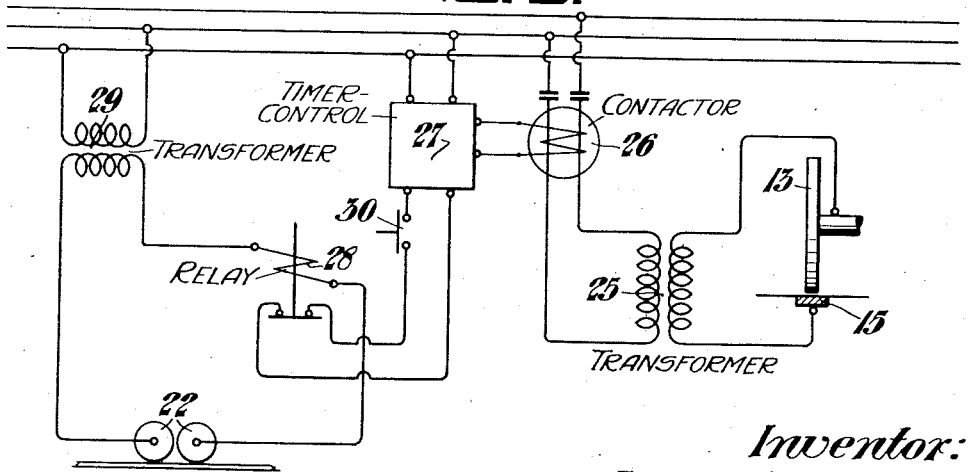

Patented May 26, 1942

2,284,403

UNITED STATES PATENT OFFICE 2,284,403

AUTOMATIC MEANS FOR CONTROLLING WELDING MACHINES

Frank Marquart, Cleveland, Ohio, assignor to The American Steel and Wire Company of New Jersey, a corporation of New Jersey Application March 1, 1941, Serial No. 381,328

12 Claims. (Cl. 219—4)

This invention relates to a welding machine, and particularly to an improved automatic means for controlling the operation of the same.

In a welding machine of the type which is generally used in the steel industry for welding the ends of two continuous lengths of strip metal together, there is usually provided a longitudinally extending bar, usually made of copper, which is positioned in under the bottom-most strip so as to contact the bottom surface thereof and is adapted to serve as one of the electrodes. The other electrode consists of a welding wheel arranged on a carriage which is adapted to move laterally of the metallic strips with the welding wheel adapted to contact the top surface of the top-most sheet. In the use of such a welding machine, the ends of the strips to be welded together are properly positioned in the machine and securely held therein until the welding wheel passes over the same to securely weld the strips together. Various widths of metallic strip are welded in such machines, thereby at times leaving a portion of the bottom copper bar electrode exposed to either side of the strips.

Heretofore, in such welding machines the welding current was directed to the electrodes, namely, the copper bar and the welding wheel, when the carriage, together with the welding wheel carried thereby, was ready to be moved from its position at the extreme side of the machine, either on one side or the other of the strip, and across the strips to the opposite side thereof so as to weld the strips together in its passage thereover. That is, the strips were usually positioned in the center of the welding machine with the welding wheel positioned to one side or the other thereof, a position it assumed when not in use. Accordingly, when it was desired to weld the ends of two strips together, the welding wheel necessarily would pass over a portion of the copper bar or bottom electrode in direct contact therewith before it came in contact with the strips to be welded and also contacted the copper bar for substantially the same distance on the opposite side of the strips after the welding operation. Therefore, due to the fact that the welding current was directed to the electrodes at the moment when the welding wheel left the side of the welding machine, its initial position, there resulted a sparking between the welding wheel and the copper bar electrode for a distance on either side of the strips; that is, when the welding wheel was not in contact with the top-most strip, it contacted the copper bar or bottom electrode. Such sparking between the welding wheel and copper bar electrode was undesirable in that it resulted in damaging both the welding wheel and the copper bar and necessitated a frequent replacement thereof, which was inconvenient as well as expensive.

Accordingly, it is one of the objects of my invention to provide an improved means for controlling the energization of the electrodes, namely, the welding wheel and the copper bar, whereby they are not energized until the welding wheel is in contact with the top-most strip and in position for welding the ends of the strips together, thereby eliminating any sparking between the electrodes and the consequent damage to the same.

It is another object of the invention to provide an improved means for controlling the energization of the electrodes in a welding machine for welding metallic strip material by which the welding is automatically controlled by the strip material itself, and, at the same time, a means or a mechanism which can be easily and conveniently incorporated with existing welding machines.

It is a further object of this invention to provide an improved automatic means for controlling the energization of the electrodes in a welding machine for welding metallic strip material which is simple and inexpensive in its construction and, yet, a means which is effective and efficient in its use.

Various other objects and advantages of this invention will be more apparent in the course of the following specification and will be particularly pointed out in the appended claims.

In the accompanying drawings there is shown, for the purpose of illustration, one embodiment which my invention may assume in practice.

In these drawings:

Figure 1 is a vertical section through a welding machine showing the improved automatic controlling means of my invention incorporated therewith;

Figure 2 is an enlarged section taken on line II—II of Figure 1;

Figure 3 is an enlarged section taken on line III—III of Figure 1;

Figure 4 is a front elevation of the welding machine showing my invention incorporated therewith; and Figure 5 is a wiring diagram showing how the contact wheels control the energization of the welding wheel.

Referring more particularly to the drawings, the improved means of my invention is shown incorporated with a conventional type welding machine as is used in steel manufacturing plants for welding together the opposed ends of continuous length metallic strips. As shown in Figures 1 and 4 of the drawings, such a welding machine consists generally of a frame or base 2 having side portions 3 and a top portion 4 which interconnects the side portions. There is arranged at the top of the machine a carriage 5, which is supported by a pair of spaced apart parallel cylindrical rods or shafts 6, arranged between the side portions 3 which support the same. The carriage 5 is adapted to be moved from one side of the machine to the opposite side thereof upon the shafts 6, which are adapted to guide the same in such movement. The carriage 5 is moved from one side of the machine to the opposite side thereof by means of a screw 7 disposed between the shafts 6 and supported by suitable bearings carried by the side portions 3. The screw 7 is adapted to be driven by a suitable gearing and a motor 8 preferably arranged on top of the machine at one end thereof, as shown in Figure 4.

There is arranged with the carriage 5 and positioned preferably on the top thereof a hydraulic cylinder 9 having a piston 10 which extends to a point below the shafts 6 and the screw 7. On the lower end of the piston 10 there is mounted a welder head 12 having a welding wheel 13 arranged therewith which is adapted to serve as one of the electrodes and which is adapted to be electrically energized and controlled in a manner hereinafter to be described. It will be understood that it is the purpose of the hydraulic cylinder 9 to move the piston 10, together with the head 12 and the welding wheel 13 carried thereby in a vertical plane. Below the head 12 and the welding wheel 13 there is arranged a plate-like supporting member 14 which is also supported by the side portions 3 having a bar 15, usually made of copper, arranged therewith and embedded therein. The bar 15 is disposed directly below the welding wheel 13 and extends from one side of the machine to the opposite side thereof, and which is adapted to serve as the other electrode.

There is also positioned below the head 12 rearwardly of the supporting member 14, preferably a roller 16, and there is arranged thereabove for cooperation therewith a clamping bar 17 which is pivotally mounted between the side portions 3 of the machine, and which is adapted to hold the ends of the strips securely in position against the roller 16 during the welding together of the strips.

According to the present invention, there is arranged forwardly of the welding wheel 13 a downwardly extending bracket member 18 which is supported by the head 12 in any suitable manner. There is carried by the bracket member 18 preferably an insulating block 19, on which there is mounted on the outer side thereof a pair of oppositely disposed pivotally mounted rocking members 20 with one positioned in front of the other and with inner portions of the same arranged in overlapping relation relative to each other. The rocking members 20 are pivotally supported at 21 at opposite sides of the block 19, as shown in Figures 2 and 3. There is rotatably arranged on the forward end of each of the rocking members 20 a contact wheel 22. The contact wheels 22 are arranged substantially parallel to the welding wheel 13 and are spaced apart from each other with one positioned in front of the other in overlapping relationship. The axis of each of the contact wheels 22 is spaced substantially the same distance from the vertical center line of the axis of the welding wheel 13 and the axes of the contact wheels 22 are preferably spaced apart a distance of approximately ½".

There is mounted on the outer side of the block 19 in any suitable manner above each of the rocking members 20 a spring 23. The springs 23 are adapted to force the rocking members 20, together with the contact wheels 22 carried thereby, in a downward direction so that the contact wheels are kept in contact with the top surface of the top strip to be welded. Thus, it will be seen that the rocking members 20, together with the contact wheels 22 carried thereby, are yieldable in a vertical plane relative to the insulating block 19 and the head 12. There is arranged with each of the rocking members 20 preferably a stop pin 24 carried by the block 19 which is adapted to limit the downward movement of the pivoted members.

While any suitable wiring arrangement may be provided, there is shown in Figure 5 of the drawings a wiring diagram preferable for use. In the wiring diagram shown, the welding wheel 13, together with the copper bar 15, is supplied with a low voltage current from the secondary winding of a welding transformer 25. The primary winding of this transformer is connected to any suitable power circuit preferably through a contactor 26. There is also provided preferably a welder timing device 27 which is also connected to the power line and to the contactor 26 which it is adapted to control.

The timer controls the primary circuit to the transformer 25, opening and closing this circuit at definite intervals when its control circuit is completed and is arranged so that this time period may be adjusted to suit operating conditions. That is to say, as the welding wheel passes over the material being welded, current is supplied at periodical intervals to the welding wheel by the timer causing it to weld the material in form of what is commonly known as a stitch weld.

The circuit which controls the current to the welder timing device is connected through the contact wheels 22 and relay 28 and is furnished by a transformer 29 having its primary side connected to the power line with the secondary insulated from the remainder of the control and having a low voltage for safety purposes. Thus, it will be seen that when the relay 28 is closed, the circuit in which the timing device is positioned is completed, which starts the welding cycle in the welder timing device 27. There is also provided a pressure switch 30 which acts as an interlock and which prevents operation of the device unless there is sufficient pressure exerted against the welding wheel 13.

The improved welder controlling means of my invention operates in the following manner: The opposed ends of the metallic strips to be welded are first positioned in the machine in overlapping relation in under the welding wheel 13 and between the same and the copper bar 15, as shown in Figure 1 of the drawings. The clamping bar 17 is then lowered so as to rest upon the same, thereby properly holding the ends of strips in position for welding the same together. The welder head 12, together with the welding wheel 13 and contact wheels 22 carried thereby, is then lowered by means of the hydraulic cylinder 9 until the welding wheel 13 rests upon the copper bar 15 with a slight pressure. The carriage 5 upon which the welder head 12 is mounted is then moved laterally of the strip by means of the motor 8 and the screw 7. It will be seen that in such movement, the welding wheel 13, together with the contact wheels 22, will contact the upper surface of the top-most sheet as they pass thereover. When both of the contact wheels 22 have come into contact with the strip, the circuit in which the relay 28 is positioned is complete, thereby closing its contacts, and they are held closed as long as both contact wheels 22 are in contact with the strip; that is, the strip acts as part of the circuit and the same is completed therethrough.

When the relay 28 closes, the circuit is completed through the timing control 27, thereby permitting the same to energize the welding wheel through the contactor 26. Thus, it will be seen that the welding wheel 13 is prevented from being energized until the contact wheels 22 have been moved into contact with the strip, and the welding wheel at such time is positioned about a quarter of an inch from the edge of the strips, due to the position of the contact wheels 22 relative thereto before the circuit is conditioned for welding. The welding is continued across the strips until one of the contact wheels moves out of contact with the strip, thereby breaking the circuit and preventing the welding wheel 13 from being energized.

It will be understood that the welding wheel cannot be energized until both of the contact wheels are in contact with the strip so as to complete the circuit therethrough in order to condition the welding circuit for welding. It will be seen that with such an arrangement the welder head can be started from either side of the machine; that is, if the welder head is positioned at the right side of the machine at the end of any particular welding operation, the next welding operation can be started when the head is positioned on this side of the machine, and the same is true if the head were positioned on the left side of the machine at the end of any particular welding operation.

As a result of my invention, it will be seen that there is provided a simple inexpensive means for controlling the operation of a welding machine and, at the same time, one which is foolproof, wherein the welding operation cannot take place until the material or strips to be welded are properly positioned in the machine. In such an arrangement, it will be seen that any danger of the welding wheel 13 or the copper bar 15 becoming damaged due to sparking is entirely eliminated, which is a decided advantage.

While I have shown and described one specific embodiment of my invention, it will be understood that this embodiment is merely for the purpose of illustration and description and that various other forms may be devised within the scope of my invention, as defined in the appended claims.

I claim:

1. In a welding machine of the class described for welding metallic articles, an electrically energized welding wheel, an electric circuit with said welding wheel arranged therein, and means which is adapted to contact the article being welded, said contacting means adapted to control the energization of said circuit and said welding wheel and to permit the welding wheel to be energized when said contacting means contacts the article to be welded.

2. In a welding machine of the class described for welding metallic articles, a carriage arranged for movement on the machine, an electrically energized welding wheel carried by said carriage, and means arranged with said carriage which is adapted to contact the article to be welded during the time the carriage together with the welding wheel carried thereby is moving therealong, said contacting means adapted to control the energization of said welding wheel and to permit the same to be energized when said contacting means contacts the article to be welded.

3. In a welding machine of the class described, the combination as defined in claim 2 wherein the means for contacting the article to be welded for controlling the energization of the welding wheel consists of a pair of spaced apart wheels arranged with the carriage with one arranged in back of the other.

4. In a welding machine of the class described for welding metallic articles, a carriage arranged for movement on the machine, an electrically energized welding wheel carried by said carriage, and a pair of contacting members arranged with said carriage which are adapted to contact the article to be welded during the time the carriage together with the welding wheel carried thereby is moving therealong, said contacting members adapted to control the energization of said welding wheel and to permit the same to be energized when said contacting members contact the article to be welded.

5. In a welding machine of the class described for welding metallic articles, a carriage arranged for movement on the machine, an electrically energized welding wheel carried by said carriage, and a pair of spaced apart contacting members arranged with said carriage to one side of said welding wheel which are adapted to contact the article to be welded during the time the carriage together with the welding wheel carried thereby is moving therealong, each of said contacting members being spaced substantially the same distance from the vertical center line of the axis of said welding wheel, said contacting members adapted to control the energization of said welding wheel and to permit the same to be energized when both of the contacting members contact the article to be welded.

6. In a welding machine of the class described for welding metallic articles, a carriage arranged for movement on the machine, an electrically energized welding wheel carried by said carriage, and a pair of spaced apart contacting wheels arranged with said carriage to one side of said welding wheel with the axis of each of them being arranged substantially parallel to the axis of said welding wheel, each of said contacting wheels being arranged so that their axes are spaced substantially the same distance from the vertical center line of the axis of said welding wheel, said contacting wheels adapted to control the energization of said welding wheel and to permit the same to be energized when both of said contacting wheels contact the article to be welded.

7. In a welding machine of the class described for welding metallic articles, a carriage arranged for movement on the machine, an electrically energized welding wheel carried by said carriage, a pair of spaced apart contacting wheels arranged to one side of said welding wheel and substantially parallel thereto, which are adapted to contact the article to be welded during the time the carriage together with the welding wheel carried thereby is moving therealong, means for yieldably mounting said contacting wheels on said carriage, each of said contacting wheels being arranged so that their axes are spaced the same distance from the vertical center line of the axis of said welding wheel, said contacting wheels adapted to control the energization of said welding wheel and to permit the same to be energized when both of said contacting wheels contact the article to be welded.

8. In a welding machine of the class described for welding metallic articles, an electrically energized welding wheel, an electric circuit with said welding wheel arranged therein, means arranged in said circuit for controlilng the energization of said welding wheel, and a pair of spaced apart contacting members which are adapted to contact the article to be welded for controlling said controlling means, said means adapted to energize said welding wheel when both said contacting members are in contact with the article to be welded.

9. In a welding machine of the class described for welding metallic strips together, a carriage, means for moving said carriage, an electrically energized welding wheel mounted on said carriage, an electric circuit with said welding wheel arranged therein, means arranged in said circuit for controlling the energization of said welding wheel, and a pair of spaced apart contacting members mounted on said carriage which are adapted to contact the article to be welded, and a second electric circuit in which said contacting members are arranged, said second circuit adapted to condition said first mentioned circuit so that said control means arranged therein can energize said welding wheel when both of said contacting members are in contact with one of the strips.

10. In a welding machine of the class described for welding metallic strips together, a carriage, means for moving said carriage, an electrically energized welding wheel mounted on said carriage, an electric circuit with said welding wheel arranged therein, a timing device arranged in said circuit for controlling the energization of said welding wheel, and a pair of spaced apart contacting members mounted on said carriage which are adapted to contact the article to be welded, a second electric circuit in which said contacting members are arranged, and a relay arranged in said second mentioned circuit for controlling said first mentioned circuit, said second mentioned circuit adapted to close said relay when both of said contacting members arranged therein are in contact with one of said strips so as to condition said first mentioned circuit whereby the timing device can energize said welding wheel.

11. In a welding machine of the class described for welding metallic articles, an electrically energized welding wheel, an electric circuit with said welding wheel arranged therein, and at least one contacting member for controlling the energization of said circuit and said welding wheel, said contacting member adapted to contact the article to be welded whereby the welding wheel is permitted to be energized when said contacting member comes in contact with the article to be welded.

12. In a welding machine of the class described for welding metallic articles, an electrically energized welding wheel, an electric circuit with said welding wheel arranged therein, and a pair of spaced apart contacting members for controlling the energization of said circuit and said welding wheel, said contacting members adapted to contact the article to be welded whereby the welding wheel is permitted to be energized when both of said contacting members come in contact with the article to be welded.

FRANK MARQUART.